US012812642B2

(12) United States Patent
Lee et al.

(10) Patent No.: US 12,812,642 B2
(45) Date of Patent: Nov. 24, 2026

(54) TECHNIQUES FOR REPORTING CHANNEL STATE INFORMATION FOR MACHINE LEARNING-BASED CHANNEL FEEDBACK

(71) Applicant: QUALCOMM Incorporated, San Diego, CA (US)

(72) Inventors: Hyojin Lee, San Diego, CA (US); Chenxi Hao, Beijing (CN); June Namgoong, San Diego, CA (US); Taesang Yoo, San Diego, CA (US); Wei Xi, Beijing (CN); Pavan Kumar Vitthaladevuni, San Diego, CA (US); Yu Zhang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 18/693,029

(22) PCT Filed: Dec. 2, 2021

(86) PCT No.: PCT/CN2021/134957

§ 371 (c)(1),
(2) Date: Mar. 18, 2024

(87) PCT Pub. No.: WO2023/097591

PCT Pub. Date: Jun. 8, 2023

(65) Prior Publication Data

US 2025/0008513 A1 Jan. 2, 2025

(51) Int. Cl.

*H04W 72/1273* (2023.01)
*H04L 25/02* (2006.01)
*H04W 72/542* (2023.01)

(52) U.S. Cl.

CPC ..... *H04W 72/1273* (2013.01); *H04L 25/0248* (2013.01); *H04W 72/542* (2023.01)

(58) Field of Classification Search

CPC ........... H04W 72/1273; H04W 72/542; H04W 24/10; H04L 25/0248; H04L 5/0023;

(Continued)

(56) References Cited

U.S. PATENT DOCUMENTS

2012/0020434 A1* 1/2012 Callard ................ H04B 7/0478 375/296
2015/0358060 A1* 12/2015 Park .......................... H04L 1/06 370/329

(Continued)

FOREIGN PATENT DOCUMENTS

AU 2013324453 A1 * 4/2015 ............ H04W 72/23
CA 2755574 C * 9/2017 ............. H04B 7/068

(Continued)

OTHER PUBLICATIONS

International Search Report and Written Opinion—PCT/CN2021/134957—ISA/EPO—Jul. 27, 2022.

(Continued)

*Primary Examiner* — Sujoy K Kundu
*Assistant Examiner* — Vladislav Y Agureyev
(74) *Attorney, Agent, or Firm* — ArentFox Schiff LLP

(57) ABSTRACT

Aspects described herein relate to encoding, based on an estimated channel matrix of a reference signal received from a base station, channel state information (CSI) using a machine learning (ML)-based CSI encoder, transmitting, to the base station, an output of the ML-based CSI encoder and assistance information related to the estimated channel matrix, and receiving, from the base station, a scheduling grant for a downlink channel having at least one parameter that is based on the output of the ML-based CSI encoder and the assistance information. Other aspects relate to receiving the CSI encoder output and assistance information, and transmitting the scheduling grant.

30 Claims, 6 Drawing Sheets

(58) Field of Classification Search
CPC ... H04L 5/0057; H04L 1/0026; H04B 7/0417; G06N 20/00
See application file for complete search history.

(56) References Cited

U.S. PATENT DOCUMENTS

2016/0381690 A1* 12/2016 Kim .................... H04W 72/541 370/329
2018/0176051 A1* 6/2018 Qian .................... H04L 27/2647
2018/0198497 A1* 7/2018 Wei ...................... H04B 7/0479
2018/0302142 A1* 10/2018 Fröberg Olsson ... H04B 7/0658
2018/0331744 A1* 11/2018 Gao ..................... H04B 7/0626
2019/0068303 A1* 2/2019 Gao ..................... H04B 7/0452
2019/0082435 A1* 3/2019 Noh ..................... H04B 7/0486
2020/0007246 A1* 1/2020 Chang ................... H04L 5/0057
2020/0178241 A1* 6/2020 Wu ....................... H04L 1/0026
2020/0229013 A1* 7/2020 Kim ...................... H04B 7/0478
2020/0244425 A1* 7/2020 Wu ....................... H04L 5/0057
2020/0403667 A1* 12/2020 Li ........................ H04B 7/0639
2021/0160917 A1* 5/2021 Goto ................. H04W 72/1263
2021/0176720 A1* 6/2021 Chae ...................... H04W 92/18
2021/0195462 A1 6/2021 Pezeshki et al.
2021/0266763 A1 8/2021 Yoo et al.
2021/0273706 A1 9/2021 Zeng et al.
2021/0273707 A1 9/2021 Yoo et al.
2021/0326726 A1* 10/2021 Wang ..................... G06N 3/084
2021/0351885 A1* 11/2021 Chavva .................... G06N 3/04
2022/0180251 A1* 6/2022 Pezeshki ................ G06N 20/20
2022/0286927 A1* 9/2022 Madadi ............. H04W 36/0083
2022/0294666 A1* 9/2022 Jeon .................... H04L 25/0254
2022/0330038 A1* 10/2022 Ganesan .............. H04B 7/0404
2022/0385341 A1* 12/2022 Liu ...................... H04B 7/0452
2022/0393735 A1* 12/2022 Xue ..................... H04B 7/0626
2022/0417779 A1* 12/2022 Madadi ................. H04L 5/0057
2023/0035992 A1* 2/2023 Zhang ............... H04W 72/1268
2023/0128138 A1* 4/2023 Li ........................ H04B 7/0456 370/329
2023/0131694 A1* 4/2023 Saber ................... G06N 3/0455 370/252
2023/0170950 A1* 6/2023 Zhang .................. H04B 7/0456 375/262
2023/0412230 A1* 12/2023 Saber ..................... G06N 20/10
2024/0049162 A1* 2/2024 Borsos ..................... G06N 3/08
2024/0056836 A1* 2/2024 Kovács ................. H04W 16/14
2024/0106508 A1* 3/2024 Tang ..................... H04L 1/0029
2024/0171428 A1* 5/2024 Hu .......................... H04L 5/005
2024/0260028 A1* 8/2024 Nammi ............... H04L 25/0224
2024/0340680 A1* 10/2024 Kela ..................... H04W 24/10
2024/0349082 A1* 10/2024 Li ......................... H04W 24/02
2024/0413867 A1* 12/2024 Hao ..................... H04B 7/0478
2025/0141515 A1* 5/2025 Lee ...................... H04B 7/0626
2025/0240658 A1* 7/2025 Pantelidou .............. H04L 41/16

FOREIGN PATENT DOCUMENTS

CN 105210307 A * 12/2015 ........... H04B 7/0481
CN 105264787 A * 1/2016 ........... H04B 7/0647
CN 108234073 A * 6/2018 ......... H04L 27/2647
CN 106559367 B * 8/2019 ........... H04L 25/022
CN 111277307 A * 6/2020 .......... H04W 72/542
CN 111937428 A * 11/2020 ........... H04L 5/0096
CN 113193893 A * 7/2021 ........... H04B 7/0413
CN 116018761 A * 4/2023 ........... H04L 5/0053
CN 117413496 A * 1/2024 ......... H04L 25/0254
EP 2854302 A1 * 4/2015 ......... H04L 27/2601
EP 2945414 A1 * 11/2015 ........... H04B 7/0632
EP 3226497 A1 * 10/2017 ........... H04L 1/1835
EP 3737009 A1 * 11/2020 ........... H04B 7/0486
EP 3806376 B1 * 7/2022 ........... H04B 7/0626
KR 102347361 B1 * 1/2022 ............ H04W 36/14
WO WO-2015137687 A1 * 9/2015 .......... H04W 72/541
WO WO-2019098772 A1 * 5/2019 ............ H04W 72/51
WO WO-2020213964 A1 * 10/2020 ........... G06N 3/0464
WO 2021051362 A1 3/2021
WO WO-2021079351 A1 * 4/2021 ......... H04L 12/1868
WO WO-2022086962 A1 * 4/2022 ............. G06N 3/047
WO WO-2022208673 A1 * 10/2022 ............ H04W 72/04
WO 2023077349 A1 5/2023
WO WO-2025165507 A1 * 8/2025 ........... H04B 7/0658

OTHER PUBLICATIONS

Supplementary European Search Report—EP21966024—Search Authority—Munich—Jul. 24, 2025.
ZTE: "On UE Adaptation to Maximum Number of MIMO Layer", 3GPP Draft, 3GPP TSG RAN WG1 #99, R1-1911927, 3rd Generation Partnership Project, Mobile Competence Centre, 650, Route Des Lucioles, F06921 Sophia-Antipolis Cedex, France, vol. RAN WG1, No. Reno, USA, Nov. 18, 2019-Nov. 22, 2019, Nov. 9, 2019, XP051823108, pp. 1-4, 2.1 Generic CSI measurement procedure.

* cited by examiner

TECHNIQUES FOR REPORTING CHANNEL STATE INFORMATION FOR MACHINE LEARNING-BASED CHANNEL FEEDBACK

CLAIM OF PRIORITY UNDER 35 U.S.C. § 119

This application is a National Stage of International Patent Application No. PCT/CN2021/134957, filed on Dec. 2, 2021, and entitled "TECHNIQUES FOR REPORTING CHANNEL STATE INFORMATION FOR MACHINE LEARNING-BASED CHANNEL FEEDBACK," the disclosure of which is incorporated herein in its entirety.

BACKGROUND

Aspects of the present disclosure relate generally to wireless communication systems, and more particularly, to reporting channel state information (CSI) feedback.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, codebook-based CSI feedback is supported where rank indicator (RI), precoding matrix indicator (PMI), and channel quality indicator (CQI) are calculated based on precoder codebook, which is predetermined under an assumption of a given configuration and channel environment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method for wireless communication at a user equipment (UE) is provided that includes encoding, based on an estimated channel matrix of a reference signal received from a base station, channel state information (CSI) using a machine learning (ML)-based CSI encoder, transmitting, to the base station, an output of the ML-based CSI encoder and assistance information related to the estimated channel matrix, and receiving, from the base station, a scheduling grant for a downlink channel having at least one parameter that is based on the output of the ML-based CSI encoder and the assistance information.

In another aspect, a method for wireless communication at a base station is provided that includes receiving, from a UE, an output of a CSI encoder that is encoded from an estimated channel matrix, and assistance information related to the estimated channel matrix, decoding the output from the CSI encoder using a ML-based CSI decoder and based on the assistance information, and transmitting, to the UE, a scheduling grant for a downlink channel having at least one parameter that is generated based on the output from the CSI encoder and the assistance information.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
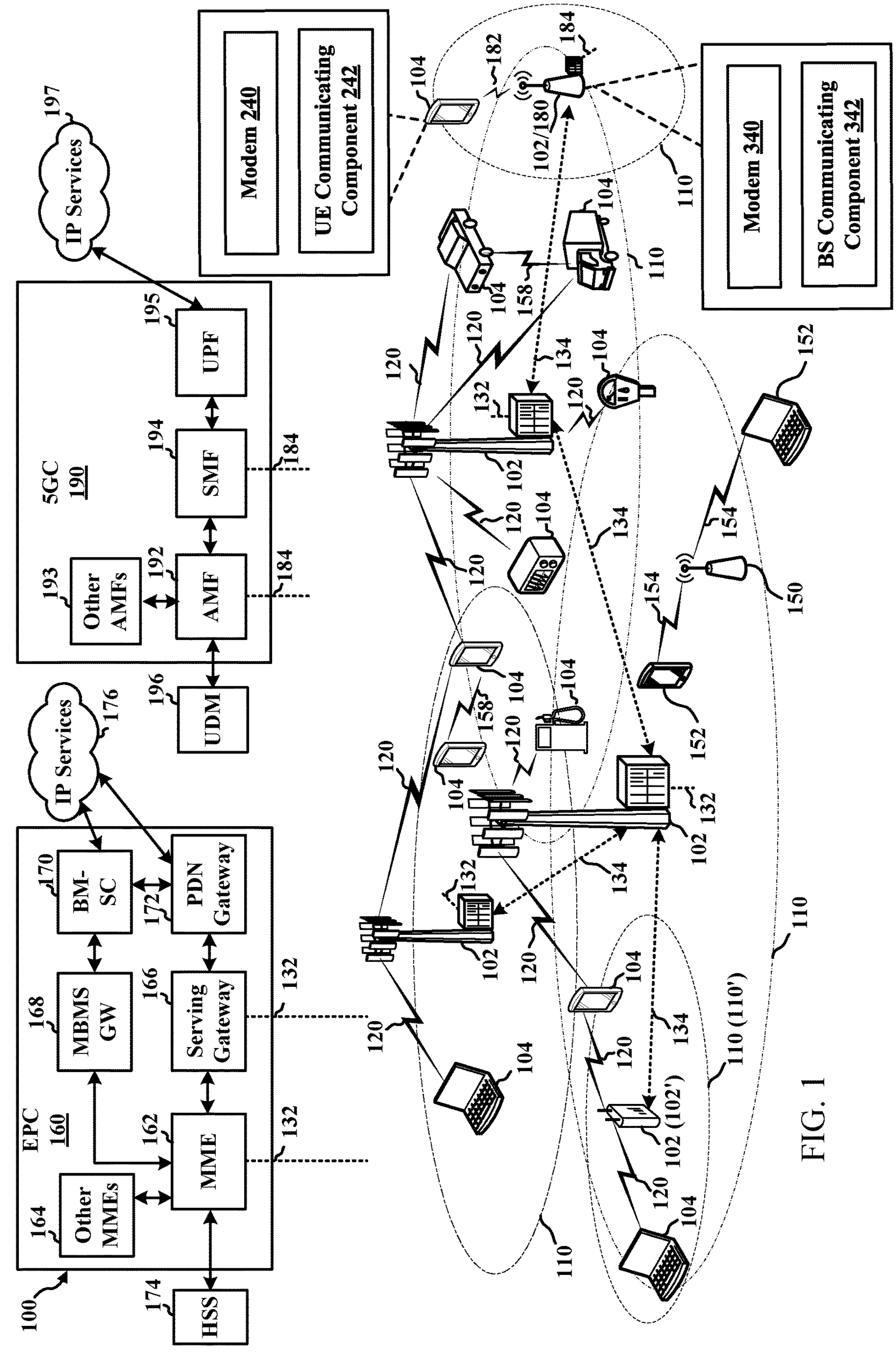
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to supporting machine learning (ML)-based channel state information (CSI) feedback. For example, in ML-based CSI feedback, a ML-based CSI encoder can be provided at a device that transmits the CSI feedback (e.g., a user equipment (UE) in 5G NR), and a ML-based CSI decoder can be provided at a device that receives the CSI feedback (e.g., a gNB or other base station in 5G NR). CSI feedback schemes utilizing ML may provide improved performance over legacy codebook-based CSI feedback schemes, e.g., when a large number of antennas are used for downlink (DL) transmission from a base station to a UE. In addition, to provide flexibility to design and/or select a CSI decoder in gNB side, for example, a UE may not need to know the information of CSI decoder structure for the ML-based CSI feedback scheme. Where the UE does not know the decoder structure, however, different strategies can be used for calculating and/or reporting CSI to the gNB, as described further herein.

In accordance with aspects described herein, a first device (e.g., a UE) can encode CSI using an ML-based CSI encoder, and can transmit the encoded CSI along with assistance information to a second device (e.g., a gNB). In an example, based on the encoded CSI and assistance information, the first device can receive a scheduling grant or other information from the second device that is determined or generated based at least in part on the encoded CSI and the assistance information. In an example, the assistance information may include a rank indicator (RI), which can be computed using a singular value decomposition (SVD) precoder based on an estimated channel matrix. In another example, the assistance information may include a channel quality indicator (CQI) computed based on the RI, based on one or more singular values or the SVD precoder of the estimated channel matrix, and/or one or more error values. In another example, the assistance information may include one or more per-layer signal-to-interference-and-noise ratio (SINR) values. The per-layer SINR values can include one or more SINR values for signals measured at each of multiple antenna layers. In yet another example, the assistance information may include a normalized channel matrix and/or one or more of a scaling corresponding to a mean SINR, a covariance matrix of a noise-and-interference vector of the UE, diagonal components of the covariance matrix, a RI and/or CQI computed based on a SVD precoder calculated from the estimated channel matrix, or per-layer SINR values computed based on the SVD precoder, etc.

In an example, the UE providing assistance information with the CSI feedback can enable the receiving device (e.g., gNB) to decode the CSI feedback, using a ML-based decoder, and determine one or more parameters for sending a scheduling grant to the UE. The one or more parameters may include a rank, modulation and coding scheme (MCS), or other parameters for UE communication. This can improve receiving of communications at the UE, where the scheduling grant can be generated to schedule resources based on channel state observed by the UE. In addition, this can improve the quality of communications by enabling optimal scheduling of resources, accordingly conserving communication resources, etc., which can accordingly improve user experience when using the UE.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 242 for transmitting encoded CSI and assistance information for ML-based CSI operations, in accordance with aspects described herein. In addition, some nodes may have a modem 340 and BS communicating component 342 for receiving encoded CSI and assistance information for ML-based CSI operations, in accordance with aspects described herein. Though a UE 104 is shown as having the modem 240 and UE communicating component 242 and a base station 102/gNB 180 is shown as having the modem 340 and BS communicating component 342, this is one illustrative example, and substantially any node or type of node may include a modem 240 and UE communicating component 242 and/or a modem 340 and BS communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UE communicating component 242 can receive a reference signal from the base station 102 (e.g., a CSI-reference signal (CSI-RS), and can determine one or more CSI feedback parameters based on an estimated channel matrix for the reference signal. UE communicating component 242 can encode the one or more CSI feedback parameters using a ML-based encoder and can transmit the one or more encoded CSI feedback parameters, with assistance information, to the base station 102. For example, UE communicating component 242 can receive, from the base station 102, a scheduling grant or other information including one or more parameters determined based on the CSI feedback. In an example, the BS communicating component 342 can receive the encoded CSI feedback and assistance information from the UE 104, decode the encoded CSI feedback using a ML-based CSI decoder, and/or generate a scheduling grant or other information for the UE 104 based on the decoded CSI feedback and/or assistance information. BS communicating component 342, for example, can transmit the scheduling grant or other information to the UE 104.

Figure 2:
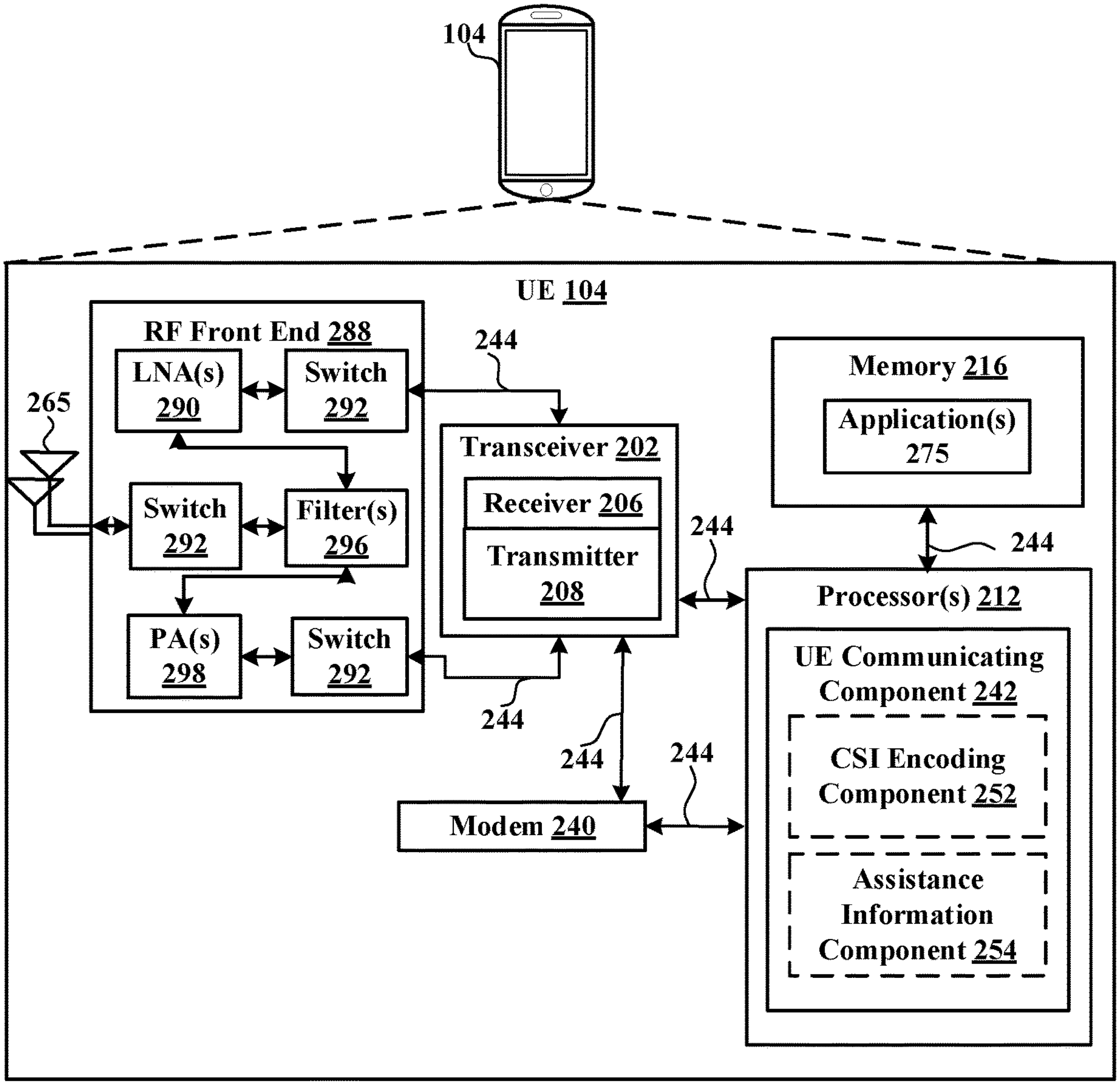
FIG. 2 is a block diagram illustrating an example of a user equipment (UE), in accordance with various aspects of the present disclosure.
Figure 3:
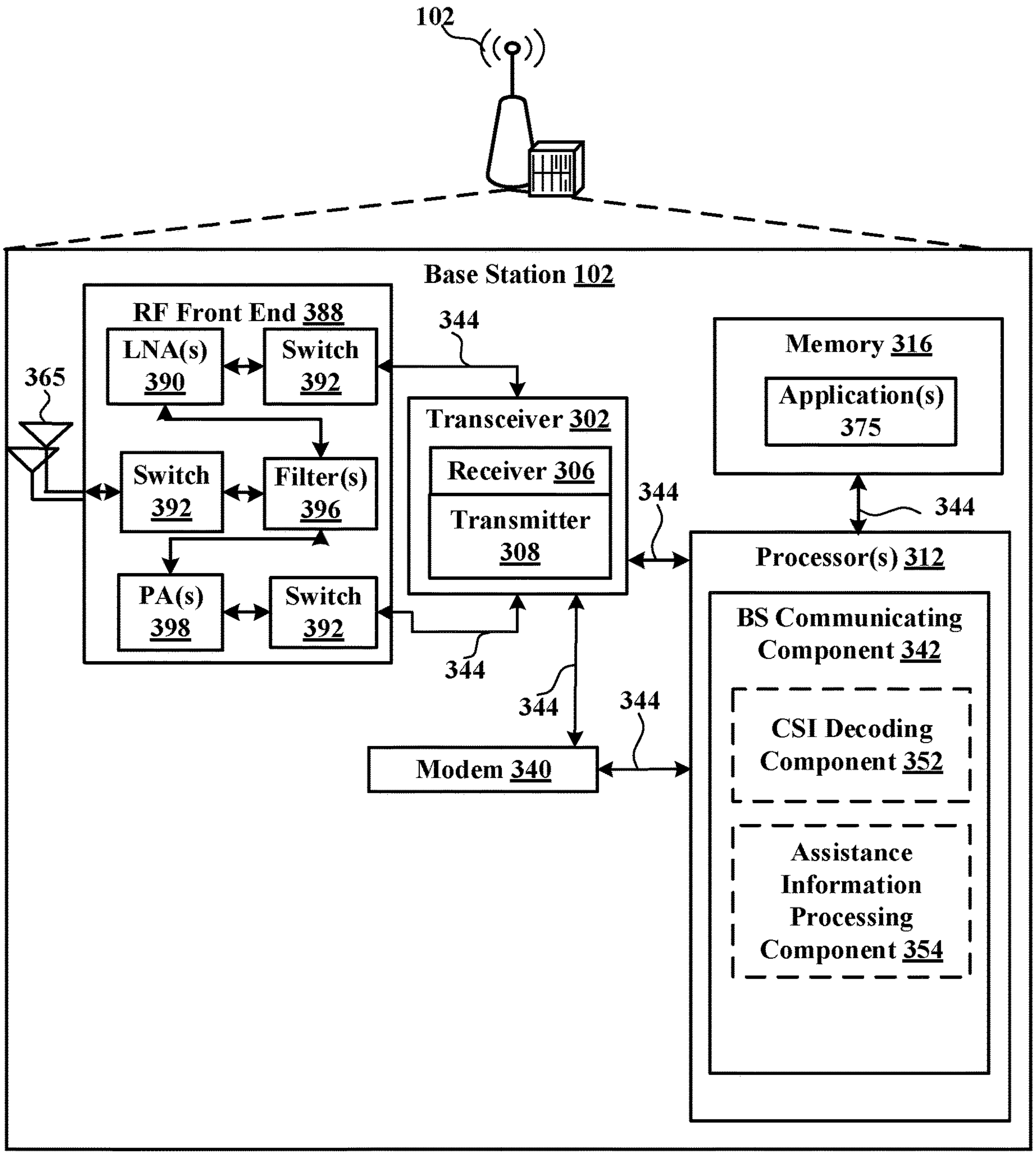
FIG. 3 is a block diagram illustrating an example of a base station, in accordance with various aspects of the present disclosure.
Figure 4:
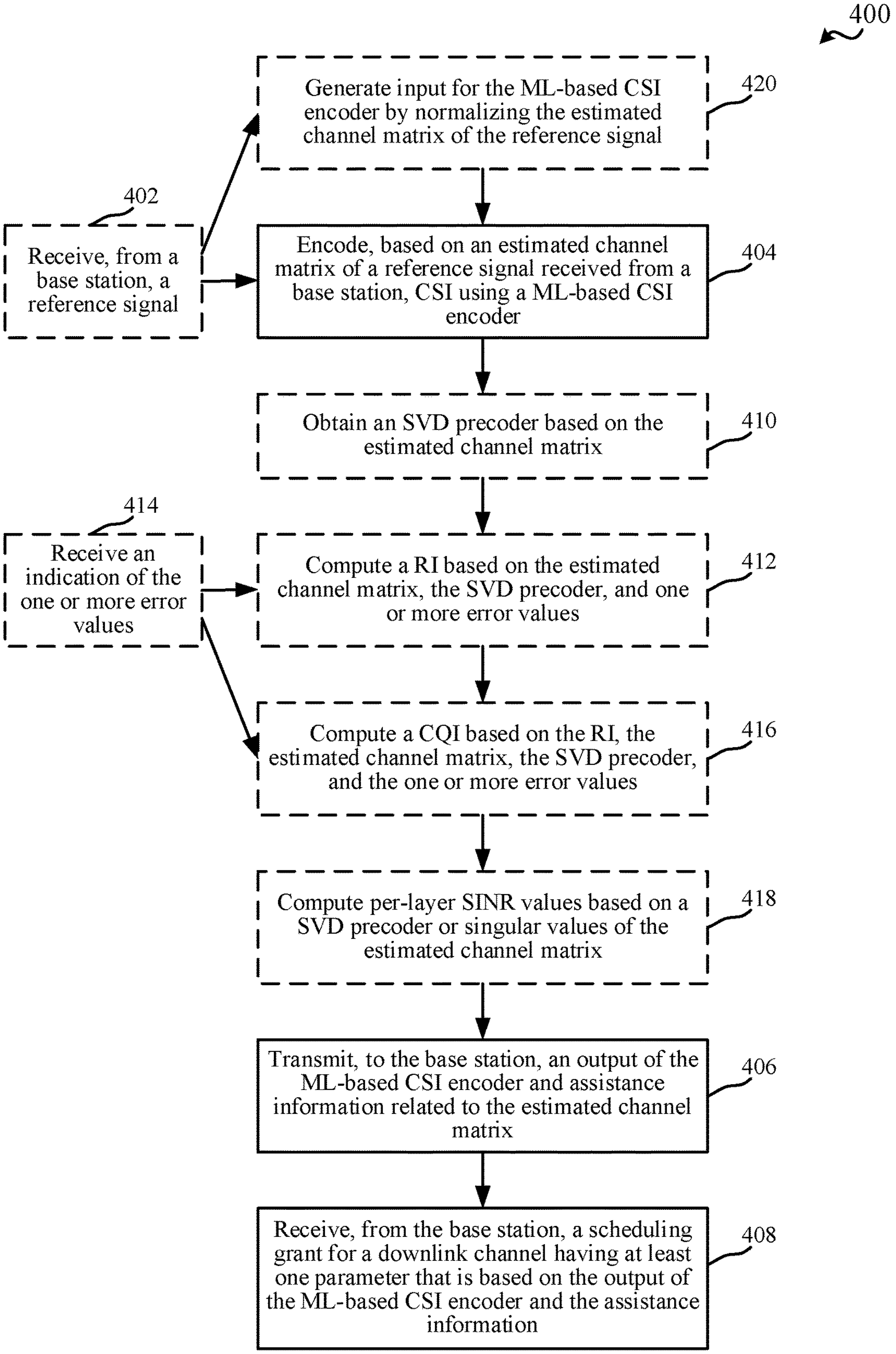
FIG. 4 is a flow chart illustrating an example of a method for encoding and transmitting channel state information (CSI) feedback with assistance information, in accordance with aspects described herein.
Figure 5:
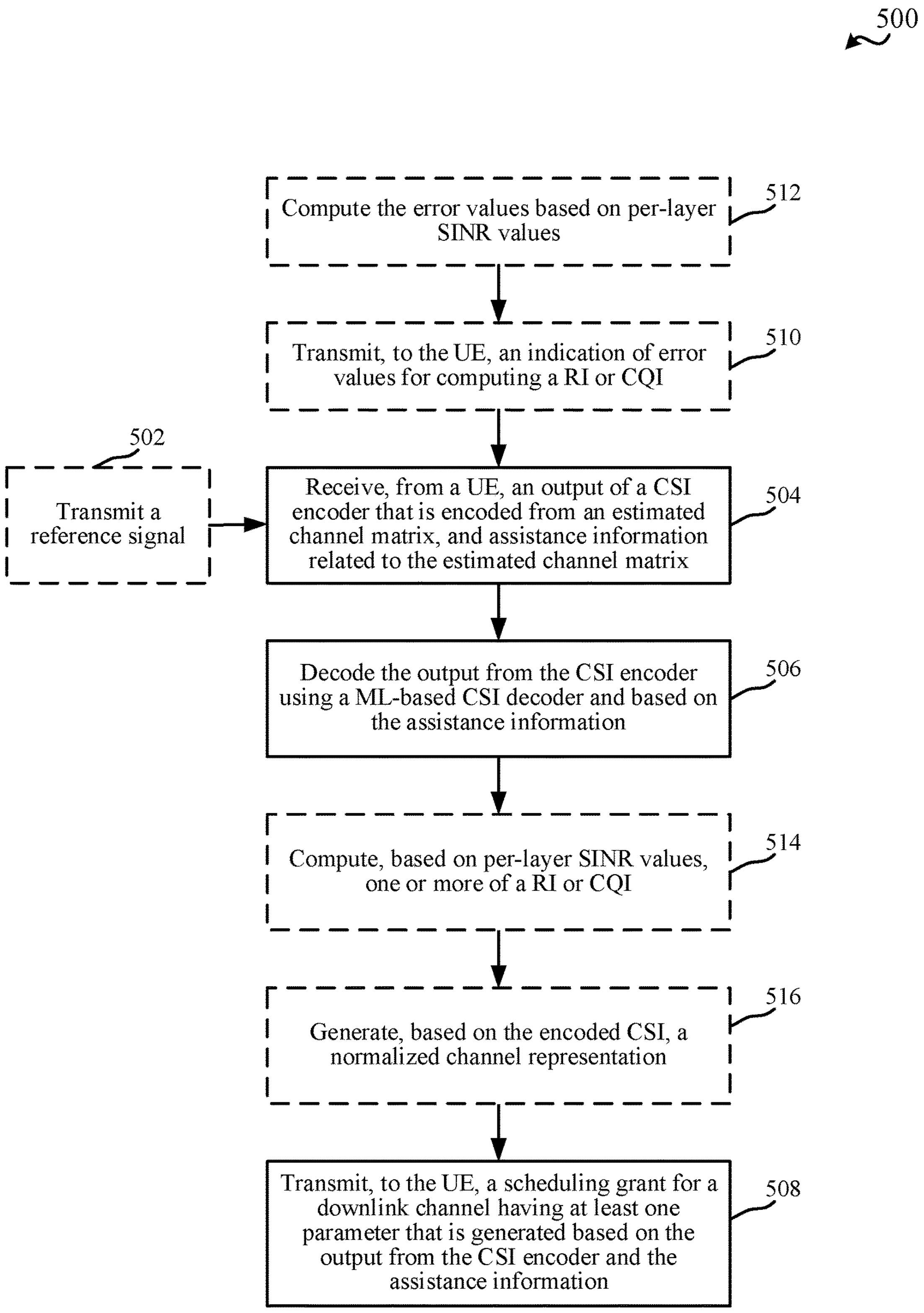
FIG. 5 is a flow chart illustrating an example of a method for decoding CSI feedback and/or generating at least one parameter based on the decoded CSI feedback and/or assistance information, in accordance with aspects described herein.

Turning now to FIGS. 2-6, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or UE communicating component 242 for transmitting encoded CSI and assistance information for ML-based CSI operations, in accordance with aspects described herein.

In an aspect, the one or more processors 212 can include a modem 240 and/or can be part of the modem 240 that uses one or more modem processors. Thus, the various functions related to UE communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with UE communicating component 242 may be performed by transceiver 202.

Also, memory 216 may be configured to store data used herein and/or local versions of applications 275 or UE communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining UE communicating component 242 and/or one or more of its subcomponents, and/or data associated therewith, when UE 104 is operating at least one processor 212 to execute UE communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAS) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 242 can optionally include a CSI encoding component 252 for encoding CSI using a ML-based CSI encoder, and/or an assistance information component 254 for generating assistance information for transmitting with encoded CSI feedback, in accordance with aspects described herein.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and BS communicating component 342 for receiving encoded CSI and assistance information for ML-based CSI operations, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, BS communicating component 342 can optionally include a CSI decoding component 352 for decoding CSI feedback received from a UE, and/or an assistance information processing component 354 for processing assistance information received for the encoded CSI, which can be used for determining at least one parameter for a scheduling grant or other information to be transmitted to the UE 104, in accordance with aspects described herein.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for encoding and transmitting CSI feedback with assistance information, in accordance with aspects described herein. In an example, a UE 104 can perform the functions described in method 400 using one or more of the components described in FIGS. 1 and 2.

In method 400, optionally at Block 402, a reference signal can be received from a base station. In an aspect, UE communicating component 242, e.g., in conjunction with processor(s) 212, memory 216, transceiver 202, etc., can receive, from a base station (e.g., base station 102), a reference signal. For example, UE communicating component 242 can receive, from the base station, a CSI-RS over time and frequency resources indicated for CSI-RS. For example, the time and frequency resources can correspond to one or more resource blocks or other units of frequency over time (e.g., over one or more symbols, such as orthogonal frequency division multiplexing (OFDM) symbol(s), over a slot of multiple symbols, etc., as defined in 5G NR).

In method 400, at Block 404, CSI can be encoded using a ML-based encoder and based on an estimated channel reference of a reference signal received from a base station. In an aspect, CSI encoding component 252, e.g., in conjunction with processor(s) 212, memory 216, transceiver 202, UE communicating component 242, etc., can encode, based on the estimated channel matrix of the reference signal received from the base station, CSI using ML-based CSI encoder. For example, CSI encoding component 252 can estimate the channel matrix based on the received reference signal, which may be a CSI-RS or other signal from which the channel matrix can be estimated. In an example, CSI encoding component 252 can estimate the $M_r \times M_t$ channel matrix, H, where $M_r$ is the number of receive antennas and $M_t$ is the number of transmit antennas. CSI encoding component 252 can provide the estimated channel matrix, H, as input to a ML-based CSI encoder, which can be provided by the CSI encoding component 252. For example, CSI encoding component 252 can be configured with the ML-based CSI encoder or a corresponding model, such that the CSI encoding component 252 can provide the estimated channel matrix to the ML-based CSI encoder, and obtain a CSI output of the ML-based CSI encoder for providing to the base station 102.

In one example, the UE 104 may not know the encoding details of the ML-based CSI encoder, but can receive the encoded CSI output from the ML-based CSI encoder for transmitting to the base station 102. For example, the base station 102 may include a corresponding ML-based CSI decoder that can decode the encoded CSI to generate a CSI output, which can be a precoding matrix that optimizes a given metric (e.g., a capacity or means squared error (MSE) between the precoding matrix and a SVD precoding matrix), a channel representation that optimizes a given metric (e.g., MSE between the input channel matrix and an output channel representation), etc. as described further herein. In addition, for example, the ML-based CSI encoder/decoder pair may be designed (or trained) to jointly generate decoder outputs which optimize the given metric. In addition, for example, the UE 104 may not have the knowledge of ML-based CSI decoder used by the base station 102 to decode the encoded CSI. Based on this, for example, aspects described herein relate to defining RI and/or CQI when UE 104 RI/CQI reporting is defined and/or determining one or more parameters for a UE scheduling grant, such as rank and MCS, at the base station 102 when UE 104 RI/CQI reporting is not defined.

In method 400, at Block 406, an output of the ML-based CSI encoder and assistance information related to the estimated channel matrix can be transmitted to the base station. In an aspect, UE communicating component 242, e.g., in conjunction with processor(s) 212, memory 216, transceiver 202, etc., can transmit, to the base station (e.g., base station 102), the output of the ML-based CSI encoder and assistance information related to the estimated channel matrix. As described further herein, for example, assistance information component 254 can generate assistance information for including with the encoded CSI, which can assist the base station 102 in determining the CSI or otherwise generating a parameter for a corresponding scheduling grant for the UE 104 or other information. As described further herein, the assistance information may include one or more of a RI, which can be computed using a SVD precoder based on the estimated channel matrix, a CQI computed based on the RI, based on one or more singular values or the SVD precoder of the estimated channel matrix, and/or one or more error values, etc. In another example, the assistance information may include one or more per-layer SINR values. In yet another example, the assistance information may include a normalized channel matrix and/or one or more other parameters.

In method 400, at Block 408, a scheduling grant for a downlink channel having at least one parameter that is based on the output of the ML-based CSI encoder and the assistance information can be received from the base station. In an aspect, UE communicating component 242, e.g., in conjunction with processor(s) 212, memory 216, transceiver 202, etc., can receive, from the base station (e.g., base station 102), the scheduling grant for the downlink channel having at least one parameter that is based on the output of the ML-based CSI encoder and the assistance information. For example, the downlink channel may correspond to a physical downlink control channel (PDCCH), physical downlink shared channel (PDSCH), etc. In addition, for example, the at least one parameter my include a rank or MCS for the scheduling grant, which may be selected and/or other specified based on the reported CSI and/or assistance information, as described further herein. In this example, UE communicating component 242 can receive downlink communications over the downlink channel based on the rank or MCS.

In one example, as part of generating assistance information, optionally at Block 410, an SVD precoder can be obtained based on the estimated channel matrix. In an aspect, assistance information component 254, e.g., in conjunction with processor(s) 212, memory 216, transceiver 202, UE communicating component 242, etc., can obtain the SVD precoder based on the estimated channel matrix. For example, assistance information component 254 can compute the SVD of the estimated channel matrix as $H=U\Sigma v^{\dagger}$, where U is a $M_r \times M_t$ left singular matrix, V is a $M_t \times M_t$ right singular matrix, and $\Sigma$ is a $M_r \times M_t$ diagonal matrix with ordered singular values ($\sigma_1 \geq \sigma_2 \geq \ldots \sigma_{M_t}$). For example, an optimal unitary precoder of rank r can be $$\frac{1}{\sqrt{r}} V_r,$$

which is $M_t \times r$ matrix with the first r columns of V. In this example, given:

$$y = \frac{1}{\sqrt{r}} H V_r x + n$$

and $$z = u_r^{\dagger} y = \frac{1}{\sqrt{r}} \begin{bmatrix} \sigma_1 & \ldots & 0 \\ \vdots & \ddots & \vdots \\ 0 & \ldots & \sigma_r \end{bmatrix} \begin{bmatrix} x_1 \\ \vdots \\ x_r \end{bmatrix} n'$$

assistance information component 254 can compute a RI based on the SVD precoder as:

$$R^* = \underset{r \in (1,2,\ldots,R)}{\operatorname{argmax}} \sum_{i=1}^{r} SE_{est}\left(\frac{\sigma_i^2}{r}\right)$$

or can compute CQI based on the SVD precoder as:

$$CQI^* = f\left(\sum_{i=1}^{R^*} SE_{est}\left(\frac{\sigma_i^2}{R^*}\right)\right),$$

where $SE_{est}(\cdot)$ is a function of estimating the spectral efficiency and $f(\cdot)$ is a function to map the spectral efficiency to CQI.

In another example, as part of generating assistance information where RI can be determined and/or reported by the UE, optionally at Block 412, a RI can be computed based on the estimated channel matrix, the SVD precoder, and one or more error values. In an aspect, assistance information component 254, e.g., in conjunction with processor(s) 212, memory 216, transceiver 202, UE communicating component 242, etc., can compute the RI based on the estimated channel matrix, the SVD precoder, and the one or more error values. For example, assistance information component 254 can compute a RI based on the SVD precoder as:

$$R^* = \underset{r \in (1,2,\ldots,R)}{\operatorname{argmax}} \sum_{i=1}^{r} SE_{est}\left(\frac{\sigma_i^2/\Delta_i}{r}\right)$$

where $\Delta_i$ can be average error values between per-layer SINR for the SVD precoder and the per-layer SINR for a computed precoder. In an example, the base station 102 may compute the average error values, which can be performed in a training or test phase of ML-based CSI encoder and decoder. In an example, the base station 102 can transmit an indication of the error values to the UE 104.

Thus, in one example, optionally at Block 414, an indication of the one or more error values can be received. In an aspect, assistance information component 254, e.g., in conjunction with processor(s) 212, memory 216, transceiver 202, UE communicating component 242, etc., can receive the indication of the one or more error values. For example, assistance information component 254 can receive the indication from the base station 102 in radio resource control (RRC) signaling, dynamic signaling (e.g., in downlink control information (DCI)), and/or the like. In any case, for example, assistance information component 254 can use the error values in computing the RI, as described above.

In another example, as part of generating assistance information where CQI can be determined and/or reported by the UE, optionally at Block 416, a CQI can be computed based on the RI, the estimated channel matrix, the SVD precoder, and one or more error values. In an aspect, assistance information component 254, e.g., in conjunction with processor(s) 212, memory 216, transceiver 202, UE communicating component 242, etc., can compute the CQI based on the RI, the estimated channel matrix, the SVD precoder, and the one or more error values. For example, assistance information component 254 can compute a CQI based on the SVD precoder as:

$$CQI^* = f\left(\sum_{i=1}^{R^*} SE_{est}\left(\frac{\sigma_i^2/\Delta_i}{R^*}\right)\right)$$

where $\Delta_i$ can be average error values between per-layer SINR for the SVD precoder and the per-layer SINR for a computed precoder, as described.

In the above examples, the assistance information can include the computed RI and/or the computed CQI. In one example, CSI encoding component 252 can further encode the CSI using the ML-based CSI encoder and based on the computed RI (R*). In any case, UE communicating component 242 can transmit, to the base station 102, the encoded CSI and the assistance information as including the RI and/or CQI. In this example, the base station 102 can provide the encoded CSI and/or the RI and/or CQI to a ML-based CSI decoder to determine CSI for generating the at least one parameter for the scheduling grant, as described above and further herein.

In one example, as part of generating assistance information (e.g., where the UE 104 does not report RI and/or CQI), optionally at Block 418, per-layer SINR values can be computed based on a SVD precoder or singular values of the estimated channel matrix. In an aspect, assistance information component 254, e.g., in conjunction with processor(s) 212, memory 216, transceiver 202, UE communicating component 242, etc., can compute the per-layer SINR values based on the SVD precoder or the singular values of the estimated channel matrix. For example, CSI encoding component 252 can compute ML-based CSI encoder output assuming the maximum rank or a rank configured by the base station 102, where the maximum rank is given by min $(M_t, M_r)$. Additionally, assistance information component 254 can compute or obtain per-layer SINR values $(\sigma_1, \sigma_2, \ldots, \sigma_R)$ under the assumption that the CSI decoder output $V_R$ is equivalent to SVD precoder. In an example, the per-layer SINR values may correspond to the singular values of the channel matrix. UE communicating component 242 can transmit the CSI encoder output and assistance information to the base station 102. Based on the reported per-layer SINR values, the base station 102 can compute or otherwise determine the final RI and CQI (e.g., and/or MCS) for downlink data transmission.

In one example, as part of generating assistance information, optionally at Block 420, input for the ML-based CSI encoder may be generated by normalizing the estimated channel matrix of the reference signal. In an aspect, assistance information component 254, e.g., in conjunction with processor(s) 212, memory 216, transceiver 202, UE communicating component 242, etc., can generate the input for the ML-based CSI encoder by normalizing the estimated channel matrix of the reference signal (e.g., the reference signal received at Block 402). In addition, in this example, assistance information component 254 can determine the assistance information as a scaling corresponding to a mean SINR (e.g., mean $(\text{diag}(R_{un}))$, where $R_{un}$ is the covariance matrix of the noise-and-interference vector of the UE 104 and $\text{diag}(\cdot)$ denotes the diagonal components of a matrix. In another example, assistance information component 254 can determine the assistance information as one or more of $R_{un}$ or $\text{diag}(R_{un})$. In another example, assistance information component 254 can determine the assistance information as one or more of a RI and/or CQI computed based on a SVD precoder calculated from the estimated channel matrix (e.g., as described above), or per-layer SINR values computed based on the SVD precoder, as described above, etc. In any case, UE communicating component 242 can transmit the CSI output and the assistance information to the base station 102 for determining the CSI and/or the at least one parameter for downlink communications (e.g., rank, MCS, etc.).

FIG. 5 illustrates a flow chart of an example of a method 500 for decoding CSI feedback and/or generating at least one parameter based on the decoded CSI feedback and/or assistance information, in accordance with aspects described herein. In an example, a base station 102 can perform the functions described in method 500 using one or more of the components described in FIGS. 1 and 3.

In method 500, optionally at Block 502, a reference signal can be transmitted. In an aspect, BS communicating component 342, e.g., in conjunction with processor(s) 312, memory 316, transceiver 302, etc., can transmit the reference signal (e.g., to one or more UEs). For example, BS communicating component 342 can transmit the reference signal as a CSI-RS or other reference signal, as described.

In method 500, at Block 504, an output of a CSI encoded that is encoded from an estimated channel matrix, and assistance information related to the estimated channel matrix can be received from a UE. In an aspect, BS communicating component 342, e.g., in conjunction with processor(s) 312, memory 316, transceiver 302, etc., can receive, from the UE (e.g., UE 104), the output of the CSI encoder that is encoded from the estimated channel matrix, and assistance information related to the estimated channel matrix. For example, the estimated channel matrix may correspond to a channel estimated from the reference signal transmitted at Block 502, and received at the UE 104.

In method 500, at Block 506, the output from the CSI encoder can be decoded using a ML-based CSI decoder and based on the assistance information. In an aspect, CSI decoding component 352, e.g., in conjunction with processor(s) 312, memory 316, transceiver 302, BS communicating component 342, etc., can receive, from the UE (e.g., UE 104), the output of the CSI encoder that is encoded from the estimated channel matrix, and assistance information related to the estimated channel matrix. For example, the estimated channel matrix may correspond to a channel estimated from the reference signal transmitted at Block 502, and received at the UE 104. The base station 102 can be configured to determine at least one parameter for a scheduling grant for the UE 104 (e.g., rank, MCS, etc.) based on the CSI. CSI decoding component 352 may decode the CSI and/or determine one or more CSI values or other parameters based on the received assistance information, as described above and further herein.

In method 500, at Block 508, a scheduling grant for a downlink channel having at least one parameter that is generated based on the output from the CSI encoder and the assistance information can be transmitted to the UE. In an aspect, BS communicating component 342, e.g., in conjunction with processor(s) 312, memory 316, transceiver 302, etc., can transmit, to the UE, the scheduling grant for the downlink channel having at least one parameter that is generated based on the output from the CSI encoder and the assistance information. For example, assistance information processing component 354 can process the assistance information and/or the decoded CSI to generate the at least one parameter for the scheduling grant (e.g., the rank, MCS, etc.).

In one example, the assistance information can include a RI or CQI computed based on a SVD precoder and one or more error values. In one example, in method 500, optionally at Block 510, an indication of error values for computing a RI or CQI can be transmitted to the UE. In an aspect, assistance information processing component 354, e.g., in conjunction with processor(s) 312, memory 316, transceiver 302, BS communicating component 342, etc., can transmit, to the UE (e.g., UE 104), the indication of error values for computing the RI or CQI. For example, assistance information processing component 354 can transmit the indication to the UE 104 in RRC signaling, dynamic signaling (e.g., in DCI), and/or the like. In any case, for example, the UE 104 can use the error values in computing the RI and/or CQI, as described above.

In one example, in method 500, optionally at Block 512, the error values can be computed based on per-layer SINR values. In an aspect, assistance information processing component 354, e.g., in conjunction with processor(s) 312, memory 316, transceiver 302, BS communicating component 342, etc., can compute the error values based on per-layer SINR values. For example, as described, assistance information processing component 354 may compute the average error values, which can be performed in a training or test phase of generating ML-based CSI encoder and decoder. In any case, for example, where the assistance information includes RI and/or CQI, CSI decoding component 352 can decode the CSI using the ML-based CSI decoder to obtain the CSI output (e.g., a precoding matrix or channel representation that optimizes a given metric), and can determine the at least one parameter (e.g., the rank, MCS, etc.) for the scheduling grant based on the decoded CSI output and the RI and/or CQI in the assistance information.

In another example, the assistance information can include per-layer SINR values. In one example, in method 500, optionally at Block 514, one or more of a RI or CQI can be computed based on per-layer SINR values. In an aspect, assistance information processing component 354, e.g., in conjunction with processor(s) 312, memory 316, transceiver 302, BS communicating component 342, etc., can compute, based on the per-layer SINR values, one or more of the RI or CQI. For example, assistance information processing component 354 can receive the per-layer SINR values in the assistance information from the UE 104, which can be reported based on the CSI decoder output, $\hat{V}_R$, being equivalent to SVD precoder. In addition, for example, the per-layer SINR values can correspond to singular values of the channel matrix. In any case, for example, based on the reported per-layer SINR values, assistance information processing component 354 can determine the final RI and CQI (and/or the corresponding rank or MCS) for data transmission.

In another example, the CSI encoder can encode CSI based on a normalized channel matrix, and the assistance information can include one or more of a scaling corresponding to a mean SINR, a covariance matrix of a noise-and-interference vector of the UE, diagonal components of the covariance matrix, a RI and/or CQI computed based on a SVD precoder calculated from the estimated channel matrix, or per-layer SINR values computed based on the SVD precoder. In one example, in method 500, optionally at Block 516, a normalized channel representation can be generated based on the encoded CSI. In an aspect, CSI decoding component 352, e.g., in conjunction with processor(s) 312, memory 316, transceiver 302, BS communicating component 342, etc., can generate, based on the encoded CSI, the normalized channel representation. For example, CSI decoding component 352 can generate the normalized channel representation from the normalized channel matrix provided as input to the CSI encoder at the UE 104. Based on this and/or the additional assistance information described above, assistance information processing component 354 can determine the at least one parameter as rank, precoder, MCS, etc. for providing in the scheduling grant to the UE 104.

Figure 6:
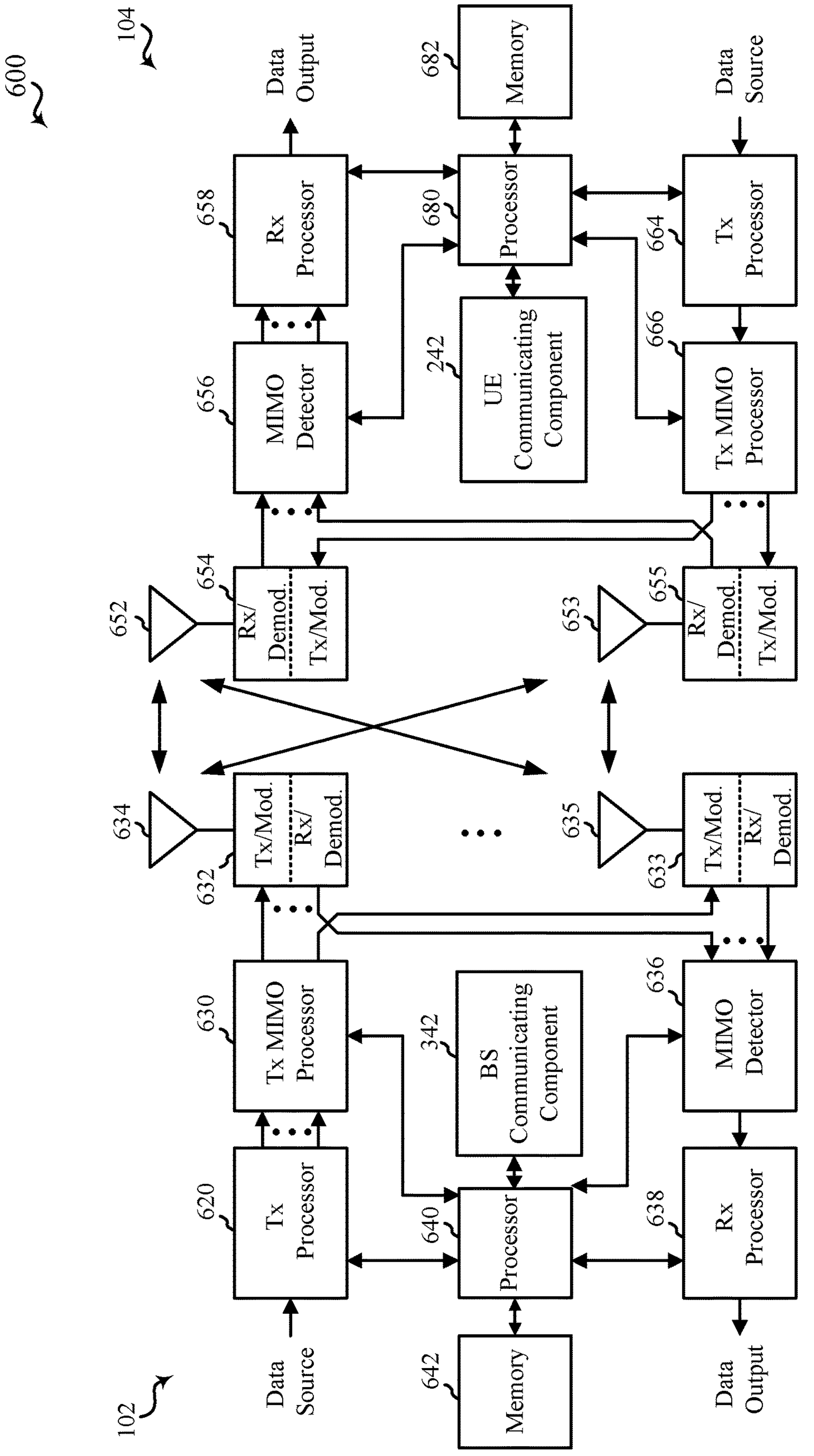
FIG. 6 is a block diagram illustrating an example of a multiple-input multiple-output (MIMO) communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a UE communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a BS communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 600.

The following aspects are illustrative only and aspects thereof may be combined with aspects of other embodiments or teaching described herein, without limitation.

Aspect 1 is a method for wireless communication at a UE including encoding, based on an estimated channel matrix of a reference signal received from a base station, CSI using a ML-based CSI encoder, transmitting, to the base station, an output of the ML-based CSI encoder and assistance information related to the estimated channel matrix, and receiving, from the base station, a scheduling grant for a downlink channel having at least one parameter that is based on the output of the ML-based CSI encoder and the assistance information.

In Aspect 2, the method of Aspect 1 includes where the assistance information includes one or more of a RI or a CQI.

In Aspect 3, the method of Aspect 2, includes where encoding the CSI is based on one or more of the RI or the CQI.

In Aspect 4, the method of any of Aspects 2 or 3 includes obtaining a SVD precoder based on the estimated channel matrix, and computing the RI based on the estimated channel matrix, the SVD precoder, and one or more error values.

In Aspect 5, the method of Aspect 4 includes receiving, from the base station in RRC signaling or dynamic signaling, an indication of the one or more error values.

In Aspect 6, the method of any of Aspects 4 or 5 includes computing the CQI based on the RI, the estimated channel matrix, the SVD precoder, and the one or more error values.

In Aspect 7, the method of any of Aspects 2 to 6 includes where the output from the ML-based CSI encoder is one or more of an indication of a precoding matrix, or an indication of a channel representation.

In Aspect 8, the method of any of Aspects 1 to 7 includes where the assistance information includes per-layer SINR values.

In Aspect 9, the method of Aspect 8 includes where encoding the CSI is based on a maximum rank or a configured rank.

In Aspect 10, the method of any of Aspects 8 or 9 includes computing the per-layer SINR values based on a SVD precoder calculated from the estimated channel matrix.

In Aspect 11, the method of any of Aspects 8 to 10 includes computing the per-layer SINR values based on singular values of the estimated channel matrix.

In Aspect 12, the method of any of Aspects 1 to 10 includes where the assistance information includes one or more of a scaling corresponding to a mean SINR, a covariance matrix of a noise-and-interference vector of the UE, diagonal components of the covariance matrix, a RI or CQI computed based on a SVD precoder calculated from the estimated channel matrix, or per-layer SINR values computed based on the SVD precoder.

In Aspect 13, the method of Aspect 12 includes generating input for the ML-based CSI encoder by normalizing the estimated channel matrix of the reference signal.

In Aspect 14, the method of any of Aspects 1 to 13 includes where the output of the ML-based CSI encoder is one or more of an indication of a precoding matrix, or an indication of a channel representation.

Aspect is a method for wireless communication at a base station including receiving, from a UE, an output of a CSI encoder that is encoded from an estimated channel matrix, and assistance information related to the estimated channel matrix, decoding the output from the CSI encoder using a ML-based CSI decoder and based on the assistance information, and transmitting, to the UE, a scheduling grant for a downlink channel having at least one parameter that is generated based on the output from the CSI encoder and the assistance information.

In Aspect 16, the method of Aspect 15 includes where the assistance information includes one or more of a RI or a CQI, where the at least one parameters is generated based on the RI or the CQI.

In Aspect 17, the method of Aspect 16 includes transmitting, to the UE in RRC signaling or dynamic signaling, an indication of error values for computing the RI.

In Aspect 18, the method of Aspect 17 includes computing the error values based on first per-layer SINR values based on a SVD precoder and second per-layer SINR values based on a computed precoder computed for the UE.

In Aspect 19, the method of any of Aspects 15 to 18 includes where the assistance information includes per-layer SINR values.

In Aspect 20, the method of Aspect 19 includes computing, based on the per-layer SINR values, one or more of a RI or a CQI, where the at least one parameter is generated based on the RI or the CQI.

In Aspect 21, the method of any of Aspects 15 to 20 includes where the assistance information includes one or more of a scaling corresponding to a mean SINR, a covariance matrix of a noise-and-interference vector of the UE, diagonal components of the covariance matrix, a RI or CQI computed based on a SVD precoder calculated from the estimated channel matrix, or per-layer SINR values computed based on the SVD precoder.

In Aspect 22, the method of Aspect 21 includes generating, based on the encoded CSI, a normalized channel representation, where the at least one parameter is generated based on the normalized channel representation and the assistance information.

Aspect 23 is an apparatus for wireless communication including a transceiver, a memory configured to store instructions, and one or more processors communicatively coupled with the memory and the transceiver, where the one or more processors are configured to execute the instructions to cause the apparatus to perform any of the methods of Aspects 1 to 22.

Aspect 24 is an apparatus for wireless communication including means for performing any of the methods of Aspects 1 to 22.

Aspect 25 is a computer-readable medium including code executable by one or more processors for wireless communications, the code including code for performing any of the methods of Aspects 1 to 22.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
- a transceiver;
- a memory configured to store instructions; and
- one or more processors communicatively coupled with the memory and the transceiver, wherein the one or more processors are configured to:
  - encode, based on an estimated channel matrix of a reference signal received from a base station, channel state information (CSI) using a machine learning (ML)-based CSI encoder;
  - transmit, to the base station, an output of the ML-based CSI encoder and assistance information related to the estimated channel matrix, wherein the assistance information includes one of:
    - a rank indicator (RI) used in encoding the output of the ML-based CSI encoder and a channel quality indicator (CQI) computed based on the RI; or
    - per-layer signal-to-interference-and-noise ratio (SINR) values computed based on the output of the ML-based CSI encoder; and
  - receive, from the base station, a scheduling grant for a downlink channel having at least one parameter that is based on the output of the ML-based CSI encoder and the assistance information.

2. The apparatus of claim 1, wherein the assistance information includes the RI and the CQI.

3. The apparatus of claim 2, wherein the one or more processors are configured to encode, using the ML-based CSI encoder, the CSI based on the RI.

4. The apparatus of claim 2, wherein the one or more processors are further configured to:
- obtain a singular value decomposition (SVD) precoder based on the estimated channel matrix; and
- compute the RI based on the estimated channel matrix, the SVD precoder, and one or more error values.

5. The apparatus of claim 4, wherein the one or more processors are further configured to receive, from the base station in radio resource control (RRC) signaling or dynamic signaling, an indication of the one or more error values.

6. The apparatus of claim 4, wherein the one or more processors are further configured to compute the CQI based on the RI, the estimated channel matrix, the SVD precoder, and the one or more error values.

7. The apparatus of claim 2, wherein the output from the ML-based CSI encoder is one or more of an indication of a precoding matrix, or an indication of a channel representation.

8. The apparatus of claim 1, wherein the assistance information includes the per-layer SINR values.

9. The apparatus of claim 8, wherein the one or more processors are configured to encode the CSI based on a maximum rank or a configured rank.

10. The apparatus of claim 8, wherein the one or more processors are further configured to compute the per-layer SINR values based on a singular value decomposition (SVD) precoder calculated from the estimated channel matrix.

11. The apparatus of claim 8, wherein the one or more processors are further configured to compute the per-layer SINR values based on singular values of the estimated channel matrix.

12. The apparatus of claim 1, wherein the assistance information further includes one or more of a scaling corresponding to a mean signal-to-interference-and-noise ratio (SINR), a covariance matrix of a noise-and-interference vector of the apparatus, or diagonal components of the covariance matrix.

13. The apparatus of claim 12, wherein the one or more processors are further configured to generate input for the ML-based CSI encoder by normalizing the estimated channel matrix of the reference signal.

14. The apparatus of claim 1, wherein the output of the ML-based CSI encoder is one or more of an indication of a precoding matrix, or an indication of a channel representation.

15. An apparatus for wireless communication, comprising:

a transceiver;

a memory configured to store instructions; and one or more processors communicatively coupled with the memory and the transceiver, wherein the one or more processors are configured to:

receive, from a user equipment (UE), an output of a channel state information (CSI) encoder that is encoded from an estimated channel matrix, and assistance information related to the estimated channel matrix, wherein the assistance information includes one of:

a rank indicator (RI) used in encoding the output of the CSI encoder and a channel quality indicator (CQI) computed based on the RI; or per-layer signal-to-interference-and-noise ratio (SINR) values computed based on the output of the CSI encoder;

decode the output from the CSI encoder using a machine learning (ML)-based CSI decoder and based on the assistance information; and transmit, to the UE, a scheduling grant for a downlink channel having at least one parameter that is generated based on the output from the CSI encoder and the assistance information.

16. The apparatus of claim 15, wherein the assistance information includes the RI and the COI, wherein the at least one parameter is generated based on the RI or the CQI.

17. The apparatus of claim 16, wherein the one or more processors are further configured to transmit, to the UE in radio resource control (RRC) signaling or dynamic signaling, an indication of error values for computing the RI.

18. The apparatus of claim 17, wherein the one or more processors are further configured to compute the error values based on first per-layer signal-to-interference-and-noise ratio (SINR) values based on a singular value decomposition (SVD) precoder and second per-layer SINR values based on a computed precoder computed for the UE.

19. The apparatus of claim 15, wherein the assistance information includes the per-layer SINR values.

20. The apparatus of claim 19, wherein the one or more processors are further configured to compute, based on the per-layer SINR values, one or more of a rank indicator (RI) or a channel quality indicator (CQI), wherein the at least one parameter is generated based on the RI or the CQI.

21. The apparatus of claim 15, wherein the assistance information includes one or more of a scaling corresponding to a mean signal-to-interference-and-noise ratio (SINR), a covariance matrix of a noise-and-interference vector of the UE, or diagonal components of the covariance matrix.

22. The apparatus of claim 21, wherein the one or more processors are further configured to generate, based on the encoded CSI, a normalized channel representation, wherein the at least one parameter is generated based on the normalized channel representation and the assistance information.

23. A method for wireless communication at a user equipment (UE), comprising:

encoding, based on an estimated channel matrix of a reference signal received from a base station, channel state information (CSI) using a machine learning (ML)-based CSI encoder;

transmitting, to the base station, an output of the ML-based CSI encoder and assistance information related to the estimated channel matrix, wherein the assistance information includes one of:

a rank indicator (RI) used in encoding the output of the ML-based CSI encoder and a channel quality indicator (CQI) computed based on the RI; or per-layer signal-to-interference-and-noise ratio (SINR) values computed based on the output of the ML-based CSI encoder; and receiving, from the base station, a scheduling grant for a downlink channel having at least one parameter that is based on the output of the ML-based CSI encoder and the assistance information.

24. The method of claim 23, wherein the assistance information includes the RI and the COI.

25. The method of claim 24, wherein encoding the CSI using the ML-based CSI encoder is based on the RI.

26. The method of claim 24, further comprising:

obtaining a singular value decomposition (SVD) precoder based on the estimated channel matrix; and computing the RI based on the estimated channel matrix, the SVD precoder, and one or more error values.

27. The method of claim 26, further comprising receiving, from the base station in radio resource control (RRC) signaling or dynamic signaling, an indication of the one or more error values.

28. The method of claim 26, further comprising computing the CQI based on the RI, the estimated channel matrix, the SVD precoder, and the one or more error values.

29. A method for wireless communication at a base station, comprising:

receiving, from a user equipment (UE), an output of a channel state information (CSI) encoder that is encoded from an estimated channel matrix, and assistance information related to the estimated channel matrix, wherein the assistance information includes one of:

a rank indicator (RI) used in encoding the output of the CSI encoder and a channel quality indicator (CQI) computed based on the RI; or per-layer signal-to-interference-and-noise ratio (SINR) values computed based on the output of the CSI encoder;

decoding the output from the CSI encoder using a machine learning (ML)-based CSI decoder and based on the assistance information; and transmitting, to the UE, a scheduling grant for a downlink channel having at least one parameter that is generated based on the output from the CSI encoder and the assistance information.

30. The method of claim 29, wherein the assistance information includes the RI and the COI, wherein the at least one parameter is generated based on the RI or the CQI.

* * * * *